(12) United States Patent
Tchernyi et al.

(10) Patent No.: US 8,746,109 B2
(45) Date of Patent: Jun. 10, 2014

(54) POP-UP CLUTCH PARKING BRAKE ACTUATOR

(71) Applicant: Magna Closures Inc., Newmarket (CA)

(72) Inventors: Andrei Tchernyi, Bolton (CA); William Wimmitoy, Sanford (CA)

(73) Assignee: Magna Closures Inc., Ontario (CA)

( * ) Notice: Subject to any disclaimer, the term of this patent is extended or adjusted under 35 U.S.C. 154(b) by 0 days.

(21) Appl. No.: 13/657,481

(22) Filed: Oct. 22, 2012

(65) Prior Publication Data

US 2013/0133464 A1 May 30, 2013

Related U.S. Application Data

(60) Provisional application No. 61/565,141, filed on Nov. 30, 2011.

(51) Int. Cl.
*G05G 1/04* (2006.01)

(52) U.S. Cl.
USPC ............................................................ 74/523

(58) Field of Classification Search
USPC ........ 74/502.2, 519, 523, 526, 528, 536, 537, 74/543
See application file for complete search history.

(56) References Cited

U.S. PATENT DOCUMENTS

| | | | | | |
|---|---|---|---|---|---|
| 4,633,733 | A | * | 1/1987 | Tavener | 74/533 |
| 4,881,425 | A | * | 11/1989 | Kanno | 74/538 |
| 5,718,308 | A | * | 2/1998 | Chung | 188/79.51 |
| 6,131,483 | A | * | 10/2000 | Kuller et al. | 74/535 |
| 6,382,048 | B1 | * | 5/2002 | Youn et al. | 74/529 |
| 7,779,722 | B2 | * | 8/2010 | Kawano et al. | 74/523 |

* cited by examiner

*Primary Examiner* — Vicky Johnson
(74) *Attorney, Agent, or Firm* — Dickinson Wright PLLC

(57) ABSTRACT

A parking brake actuator having a mounting bracket, an actuation lever, a cable, a cable reel, a tensioning spring, and a clutch. The clutch is configured for coupling the cable reel to the actuation lever when the actuation lever is pivoted to the working position and uncoupling the cable reel from the actuation lever when the actuation lever returns to the rest position. The clutch includes a first grip face fixed to the cable reel, a disk that is slidable along the pivot axis, the disk having a second grip face and being biased axially to have the second grip face engage the first grip face, and a driver that is fixed to the mounting bracket, wherein the driver axially moves the disk to disengage the second grip face from the first grip face when the actuation lever is in the rest position.

26 Claims, 8 Drawing Sheets

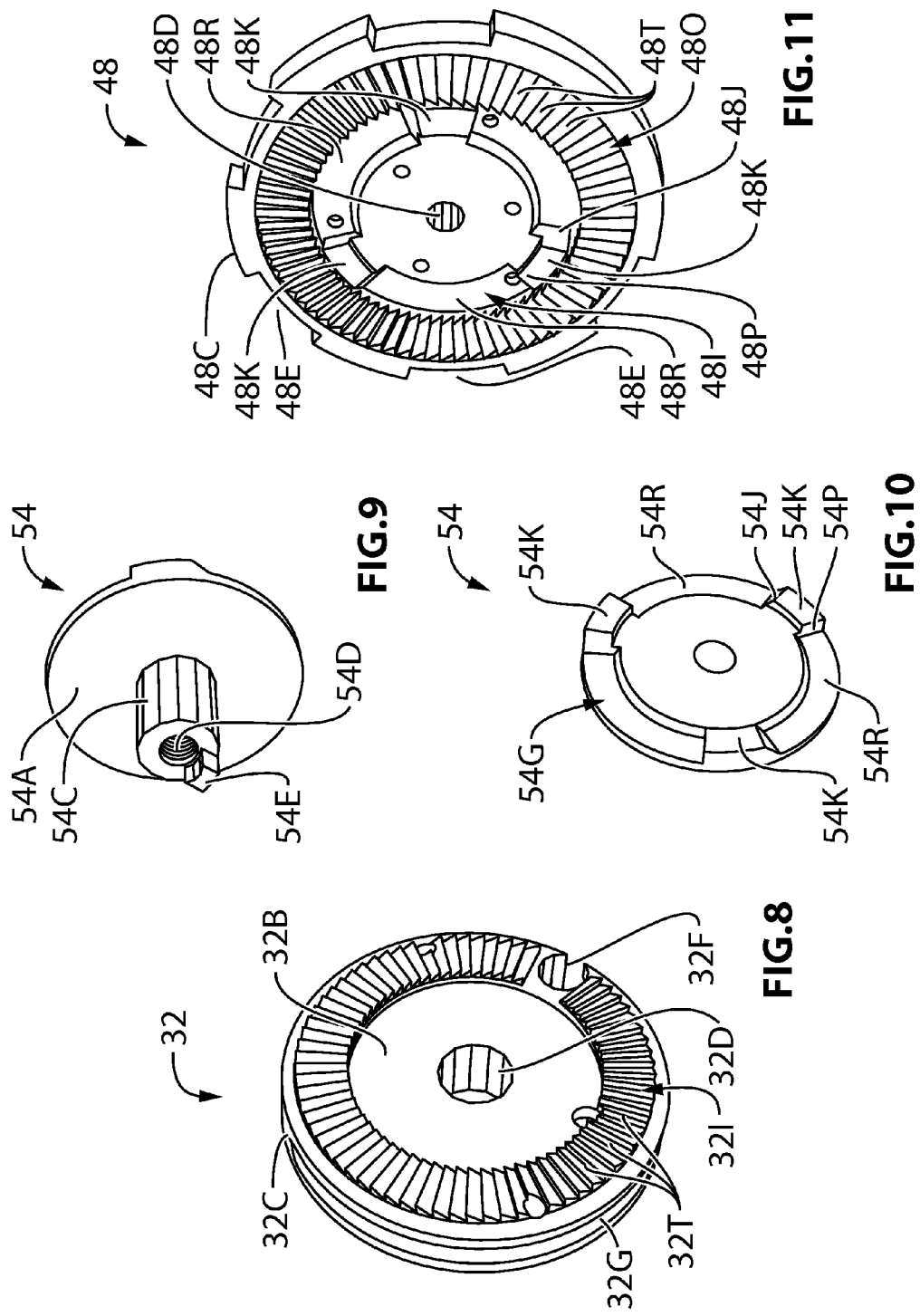

POP-UP CLUTCH PARKING BRAKE ACTUATOR

CROSS-REFERENCE TO RELATED APPLICATIONS

This application claims the benefit of U.S. Provisional Patent Application No. 61/565,141, filed Nov. 30, 2011, the contents of which are incorporated herein by reference in their entirety.

FIELD

This disclosure relates to the field of parking brake actuators.

BACKGROUND

Conventional vehicular parking brakes may have hand- or foot-operated actuators in the form of a lever that is pulled or pushed by the vehicle operator. The lever is connected to a cable which in turn actuates a braking shoe or other mechanism connected to the vehicle. The hand operated actuators are often referred to as hand brakes, whereas the foot operated parking brakes are generally referred to generically as parking brakes.

In order for a parking brake to be commercially acceptable, the parking brake generally has to provide two features. First, the parking brake actuator should ensure that there is no slack in the cable. It will be appreciated that the cable will stretch and therefore lengthen over time over time. Conventional parking brake actuators generally include some kind of tensioning mechanism to remove slack in the cable. Typically, a clutch is also provided to couple and decouple the tensioning mechanism from the operating lever.

Second, it is generally desirable to ship the parking brake actuator to the vehicle assembly plant in a condition where the tensioning mechanism is not activated so that there is plenty of slack in the cable to enable the installers to connect the cable to the braking elements without having to overcome the bias forces provided by the tensioning mechanism.

Conventional parking brake actuators that provide the above features are bulky, particularly in their width or breadth. Conventional parking brake actuators are also somewhat awkward in that that have a removable clasp (referred to as a 'grenade pin') that is used to keep the tensioning mechanism in a disabled condition prior to installation. The removable clasp is thrown away afterwards. However, in the process of installing the parking brake the personnel working the vehicle assembly line have to have access to the removable clasp which limits options for console installation. In addition, in the event the parking brake has to be serviced, the repair mechanics typically need to overcome the bias forces provided by the tensioning mechanism.

It would be beneficial to address these and other shortcomings of the prior art.

SUMMARY

In an aspect, a parking brake actuator is provided, comprising a mounting bracket, an actuation lever, a cable, a cable reel, a tensioning spring, and a clutch. The mounting bracket is configured for mounting the parking brake actuator to a vehicle. The actuation lever is pivotally mounted to the mounting bracket for pivotal movement about a pivot axis between a rest position and a working position. The cable reel is rotatable about the pivot axis. The cable has an end that is connected to the cable reel. Rotation of the cable reel in a first direction winds cable thereon and rotation of the cable reel in a second direction unwinds cable therefrom. The tensioning spring is connected between the actuation lever and the cable reel configured for taking up slack in the cable. The clutch is configured for coupling the cable reel to the actuation lever when the actuation lever is pivoted to the working position and uncoupling the cable reel from the actuation lever when the actuation lever returns to the rest position. The clutch includes a first grip face fixed to the cable reel, a disk that is slidable along the pivot axis, the disk having a second grip face and being biased axially to have the second grip face engage the first grip face, and a driver that is fixed to the mounting bracket, wherein the driver axially moves the disk to disengage the second grip face from the first grip face when the actuation lever is in the rest position.

In another aspect, a parking brake actuator is provided, comprising a mounting bracket, an actuation lever, a cable, a cable reel, a tensioning spring, and a clutch. The mounting bracket is configured for mounting the parking brake actuator to a vehicle. The actuation lever is pivotally mounted to the mounting bracket for pivotal movement about a pivot axis between a rest position and a working position. The cable reel is rotatable about the pivot axis. The cable having an end that is connected to the cable reel. Rotation of the cable reel in a first direction winds cable thereon and rotation of the cable reel in a second direction unwinds cable therefrom. The tensioning spring is connected between the actuation lever and the cable reel configured for taking up slack in the cable. The clutch is configured for coupling the cable reel to the actuation lever when the actuation lever is pivoted to the working position and uncoupling the cable reel from the actuation lever when the actuation lever returns to the rest position. The clutch includes a first grip face fixed to the cable reel, a disk slidably mounted to the actuation lever for movement along the pivot axis, the disk having a second grip face and being movable between an engaged position where the second grip face engages the first grip face and a disengaged position where the second grip face does not engage the first grip face, the driver being biased axially to one of the engaged and disengaged positions; and a driver, fixed to the mounting bracket, for moving the disk axially to the position opposite of the disk bias position as the actuation lever moves between the rest and working positions.

The disk may be biased axially to have the second grip face engage the first grip face, whereby the driver axially moves the disk to disengage the second grip face from the first grip face when the lever is brought into the rest position. According to this aspect a parking brake is provided which includes: a mounting bracket; a lever pivotally connected to the mounted bracket, the lever angularly movable about a pivot axis between a rest position and a working position; a cable; a cable reel rotatable about the pivot axis, the cable being connected to the cable reel for winding and unwinding thereon; a tensioning spring connected between the lever and the cable reel for taking up slack in the cable; and a clutch for coupling the cable reel to the lever when the lever is pivoted to the working position and uncoupling the cable reel from the lever when the lever returns to the rest position. The clutch has a first grip face fixed to the cable reel. A disk is slidably mounted to the lever to move along the pivot axis. The disk has a second grip face and is biased axially to have the second grip face engage the first grip face. A driver is fixed to the mounting bracket for axially moving the disk to disengage the second grip face from the first grip face when the lever is in the rest position.

According to another aspect a parking brake actuator is provided, comprising a mounting bracket configured for mounting the parking brake actuator to a vehicle, a lever pivotally mounted to the mounted bracket for pivotal movement about a pivot axis between a rest position and a working position, a cable, a cable reel rotatable about the pivot axis, the cable being connected to the cable reel, wherein rotation of the cable reel in a first direction winds cable thereon and rotation of the cable reel in a second direction unwinds cable therefrom, a tensioning spring connected between the actuation lever and the cable reel for taking up slack in the cable, a slot formed in the actuation lever, a slot formed in the cable reel that is registerable with the actuation lever slot when the cable reel is positioned at a point where the cable is substantially unwound from the cable reel, a pin slidably mounted in the actuation lever slot and movable into the cable reel slot when the actuation lever slot is registered with the actuation lever slot and a pushbutton actuator connected to the actuation lever, and including a rod for urging the pin out of the cable reel slot.

BRIEF DESCRIPTION OF DRAWINGS

The foregoing and other aspects will be better appreciated with reference to the accompanying drawings, wherein:

FIG. 8 is another perspective view of the cable reel shown in FIG. 7;

FIG. 9 is a perspective view of a driver employed in the parking brake actuator shown in FIG. 1;

FIG. 10 is another perspective view of the driver shown in FIG. 9;

FIG. 11 is a perspective view of a clutch disk employed in the parking brake actuator shown in FIG. 1;

DETAILED DESCRIPTION OF EXAMPLE EMBODIMENTS

Figure 1:
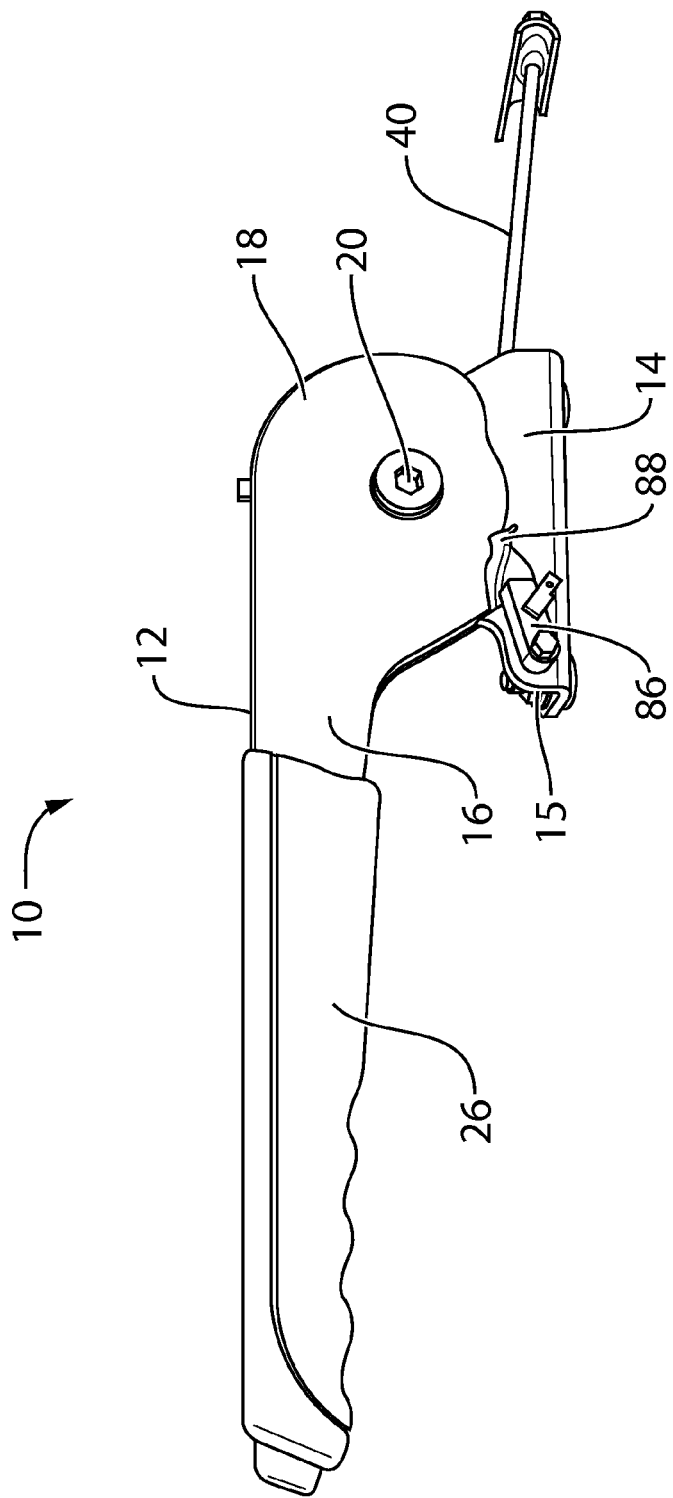
FIG. 1 is a perspective view of an embodiment of a parking brake.
Figure 2:
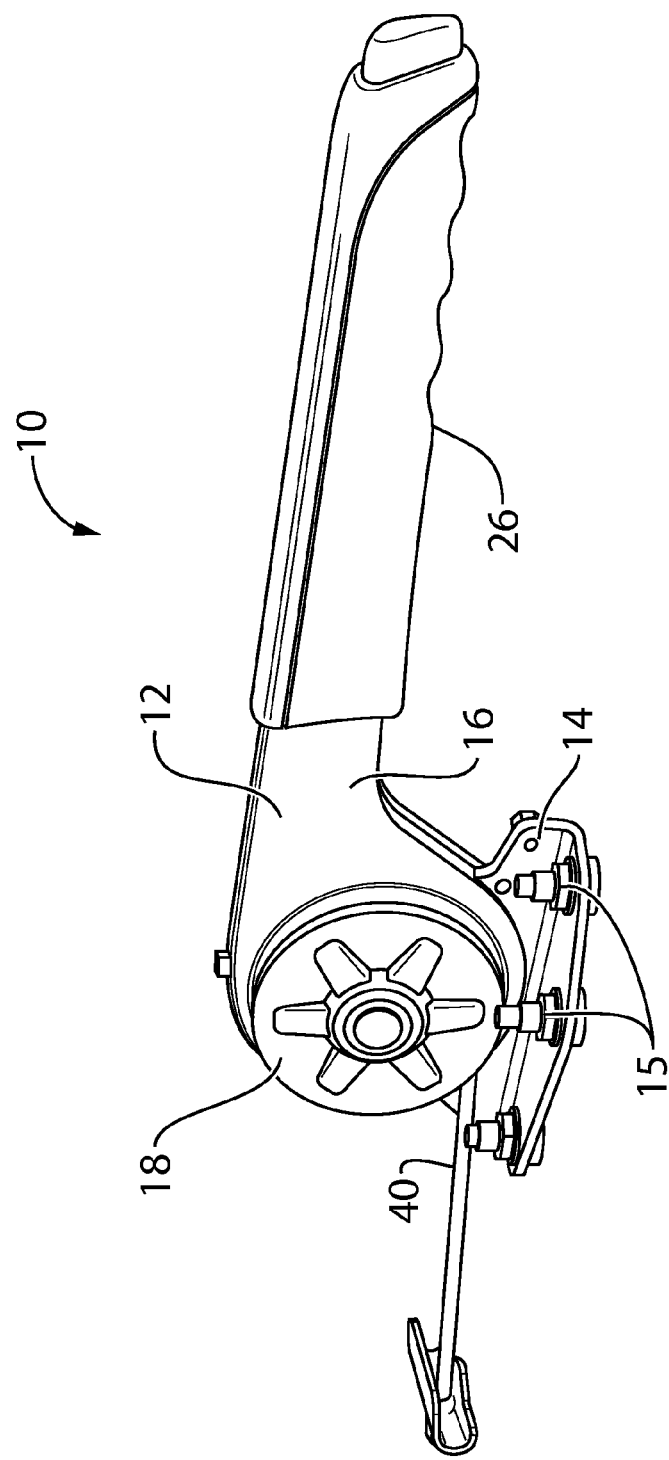
FIG. 2 is another perspective view of the parking brake actuator shown in FIG. 1.

Reference is made to FIG. 1, which shows an embodiment of a hand operated parking brake actuator 10. The parking brake actuator 10 includes an actuation lever 12, which in the embodiment shown is a handle 12 pivotally mounted to a mounting bracket 14. Referring more particularly to the assembly and exploded views of FIGS. 1-4, the handle 12 has an elongate grasping portion 16 and an end portion 18 that is pivotally mounted to the mounting bracket 14 for pivotal movement about a pivot axis A, via an axial pivot bolt 20 as described in greater detail below. The mounting bracket 14 is used for mounting the parking brake actuator to the vehicle. The mounting bracket mounts to the vehicle, (e.g., the floor pan of the vehicle), by a plurality of fasteners 15 (e.g. capscrews) and features a set of ratchet teeth 22 along an edge surface as shown in FIGS. 3 and 4.

Figure 3:
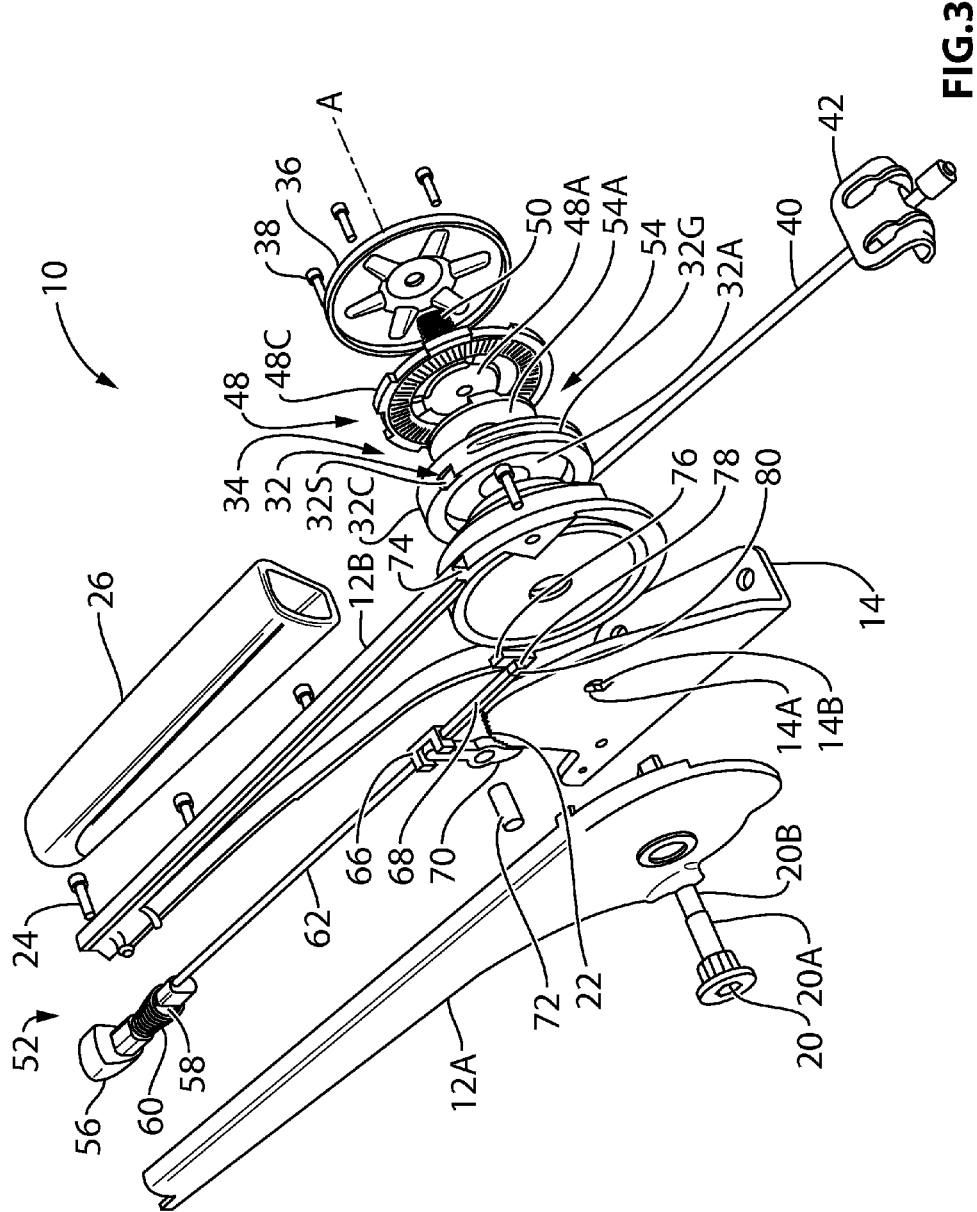
FIG. 3 is an exploded view of the parking brake actuator shown in FIG. 1.
Figure 4:
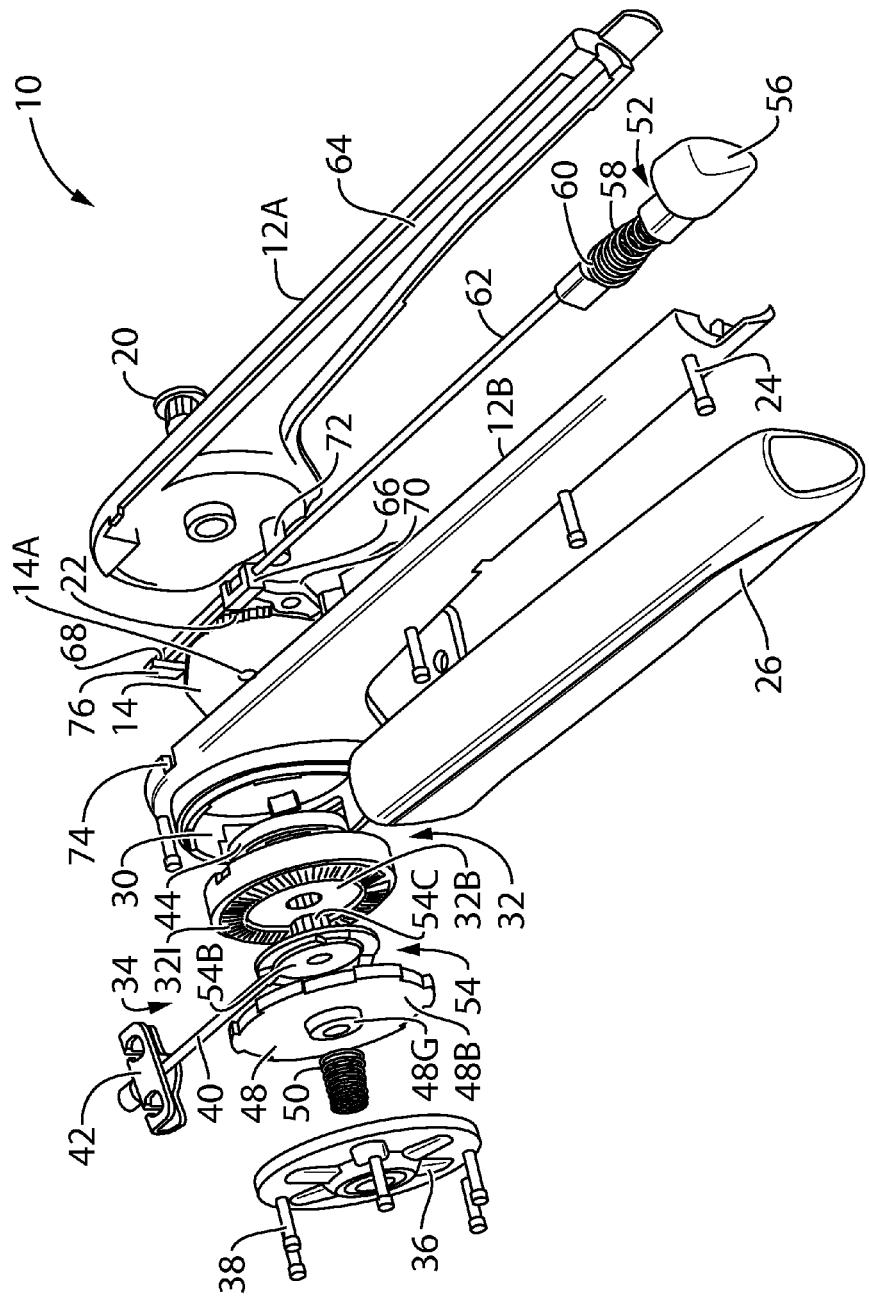
FIG. 4 is another exploded view of the parking brake actuator shown in FIG. 1.

As seen in FIGS. 3 and 4, the handle 12 may be made from first and second handle portions 12A, 12B that straddle the mounting bracket 14. The two handle portions 12A and 12B are mechanically connected together with a series of fasteners 24 (e.g. capscrews). A tubular hand grip 26 sits over the grasping portion 16 of the handle 12.

The end portion 18 of handle portion 12B features an integrated arcuate housing 30 (seen in FIGS. 4 and 5) that houses a cable tensioner reel 32 and a clutch 34 that couples and uncouples the cable tensioner reel 32 to/from the handle 12 as explained in greater detail below. The cable tensioner reel 32 and clutch 34 pivot about the pivot axis A. The housing 30 is capped by a cover plate 36 that is fastened to the housing 30 by fasteners 38 such as capscrews.

The cable tensioner reel 32 (FIG. 3) has an inner face 32A (FIG. 3), an outer face 32B (FIG. 4), and a circumferential edge 32C. The reel 32 has a spindle 32D (FIG. 7) at the center with an aperture 32E to allow the reel 32 to rotate about the pivot axis. The reel 32 is also connected to a cable 40 via a cylindrical anchor (not shown) that seats in a receptacle 32F. A groove 32G is formed in the circumferential edge 32C of the reel 32 to capture the cable 40 when the cable 40 wraps around the reel 32 during rotation of the reel 32 in a first, or cable winding direction, and to permit the cable to unwind from the reel 32 when the reel 32 rotates in a second, or cable unwinding direction. The length of the groove 32G corresponds to the amount of angular travel available for the handle 12.

The cable 40 extends between the reel 32 and a vehicle brake element (not shown) using any suitable connection means known in the art. A connector 42 is shown at the free end of the cable 40 for connecting to the aforementioned brake element. An opening 30A in the housing 30 permits the pass-through of the cable 40 between the interior and exterior of the housing 30.

Figure 5:
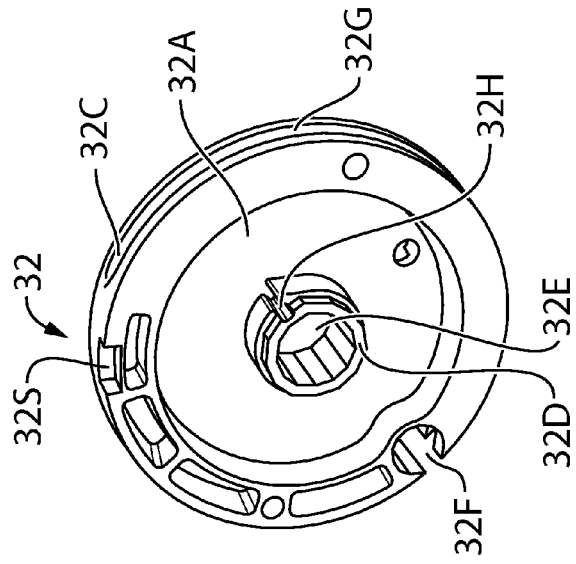
FIG. 5 is an perspective view of a housing employed in the parking brake actuator shown in FIG. 1.
Figure 6:
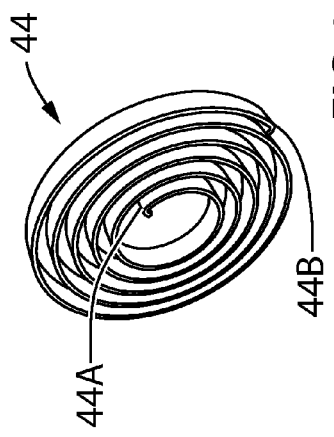
FIG. 6 is an perspective view of a tensioning element employed in the parking brake actuator shown in FIG. 1.
Figure 7:
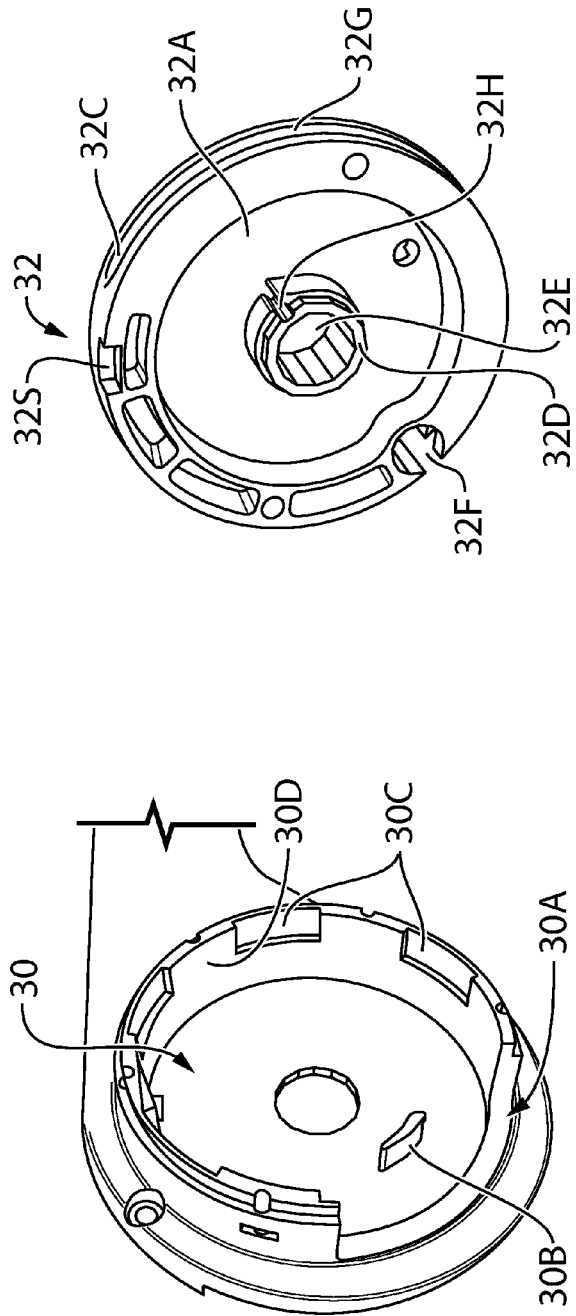
FIG. 7 is an perspective view of a cable reel employed in the parking brake actuator shown in FIG. 1.

A biasing element such as a clock spring 44 is connected between the reel 32 and the handle 12 to tension the cable 40 and remove any slack in the cable 40. Referring to FIGS. 5, 6 and 7, the inner face 32A of the reel 32 has a toroidal recess about the spindle 32D to accommodate the clock spring 44. The clock spring 44 has inner and outer ends 44A and 44B that are each shaped in the form of a hook. The outer end 44B attaches to a protrusion 30B in the housing 30 and the inner end 44A attaches to a slot 32H provided in the spindle 32D.

As seen in FIGS. 4 and 8, the outer face 32B of the cable tensioner reel 32 has an annulus 32I of sloping teeth 32T. This forms part of the clutch 34 for coupling and uncoupling the cable tensioner reel 32 to the handle 12. The clutch 34 further includes an axially movable disk 48 that engages the cable tensioner reel 32 via the toothed annulus 32I and a driver 54 for controlling the axial position of the disk 48.

The driver 54 is disposed in the housing 30 to the outside of the cable tensioner reel 32 and is fixed to the mounting bracket 14. Referring more particularly to FIGS. 3, 4, 9 and 10, the driver 54 has an inner face 54A and an outer face 54B. An axially extending shaft 54C extends from the inner face 54A. The shaft 54C has a threaded bore 54D that screws onto a threaded portion 20A (FIG. 3) of the axial pivot bolt 20. The shaft 54C seats within the inner diameter of the cable tensioner reel spindle 32D, permitting the reel 32 to rotate over the shaft 54C. The angular orientation of the shaft 54C and driver 54 is set by a key provided by a tenon 54E located at the end of the shaft 54C that seats into a mortise 14B (FIG. 3) adjacent a mounting aperture 14A for the axial pivot bolt 20 in the mounting bracket 14.

The outer face 54B of the driver 54 features an annulus 54G along an outer periphery of the driver that features a series of circumferentially spaced projections 54K. Each projection 54K has a sloped surface 54J which connects a slightly recessed annular portion 54R of the annulus 54G with an elevated plateau 54P of the projection 54K.

The axially movable clutch disk 48 (which does not necessarily need to be completely circular), has an inner face 48A (FIGS. 3 and 11), an outer face 48B (FIG. 4), and a circumferential edge. The disk 48 is slidably mounted to the housing 30 and disposed on the outer side of the driver 54. The disk 48 has an axial aperture 48D and is seated on a smooth shafted portion 20B of the axial pivot bolt 20 that is sized to allow the disk 48 to rotate about the axial pivot bolt 20 and also to move axially along the smooth shafted portion 20B.

The circumferential edge of the clutch disk 48 has a plurality of edge projections 48C spaced apart by slots 48E. The inner wall of the housing 30 similarly has a plurality of projections 30D spaced apart by slots 30C. The projections 48C and slots 48E interdigitate with the projections 30D and slots 30C so that the housing 30 and disk 48 co-rotate while permitting the disk 48 to travel axially relative to the housing 30.

The inner face 48A of the clutch disk 48 has a radially inner annulus 48I and a radially outer annulus 48O. The radially outer annulus 48O is formed from an unbroken arrangement of sloping teeth 48T which have a slope opposite to the slope of the cable tensioner reel teeth 32T. The radially inner annulus 48I features a series of circumferentially spaced projections 48K. Each projection 48K has a sloped surface 48J which connects a slightly recessed annular portion 48R of the inner annulus 48I with an elevated plateau 48P of the projection 48K. The slopes of these sloped surfaces 48J complement the slopes of the driver sloped surfaces 54J.

The outer face 48B of the disk 48 (FIG. 4) has an annular groove 48G for receiving one end of a coil spring 50 that is disposed between the disk 48 and the cover plate 36. The inner face of the cover plate 36 likewise has an annular groove (not shown) to receive the other end of the coil spring 50. This arrangement serves to bias the disk 48 axially inward.

Referring now to FIGS. 3, 4, 13 and 14, an actuator button 52 is mounted in an aperture defined by the two handle portions 12A, 12B. The actuator button 52 has a pushbutton portion 56 that extends out of the handle and is integrally connected to a shaft 58. A coil spring 60 is mounted about the shaft 58 and kept captive in the aperture to bias the pushbutton 56 outward.

The actuator button 52 is connected to a rod 62 that seats in a groove 64 (FIG. 4) formed between the handle portions 12A, 12B. The rod 62 may be any suitable type of rod, such as a slender, flexible rod, or alternatively a rigid rod. The rod 62 has a first end (which may be referred to as a front end) that engages the pushbutton 56, and a second end (which may be referred to as a rear end) is connected to (and may be integrally formed with) a dual function cam member that includes a U-shaped section 66 and a sloped end 68 (seen in FIG. 14).

The U-shaped section 66 of the dual function cam member surrounds a pawl lever 70 that is pivotally mounted to the handle portions 12A, 12B by a pin 72. The pawl lever 70 has a hook end that engages the ratchet teeth 22 of the mounting bracket 14 when the handle 12 is rotated.

The sloped end 68 of the dual function cam member interacts with a shipping pin 76 that is slidably mounted in a slot 74 formed in the upper part of the end portion 18 of handle portion 12B. This slot 74 is open to allow the shipping pin 76 to interact with a slot 32S provided in the cable tensioner reel 32. The shipping pin 76 also has a laterally extending projection 78 with a sloped end face 80 that complements the sloped end 68 of the dual function cam. Handle portion 12A has a tab 82 located above the projection 78 in order to prevent the shipping pin 76 from exiting the slot 74 altogether and a tab 84 below the projection 78 to maintain alignment of the rod 62 relative to the shipping pin 76.

An electrical switch 86 (FIG. 1) is attached to the mounting bracket 14 to receive input from a tab 88 located on handle portion 12A.

Figure 13:
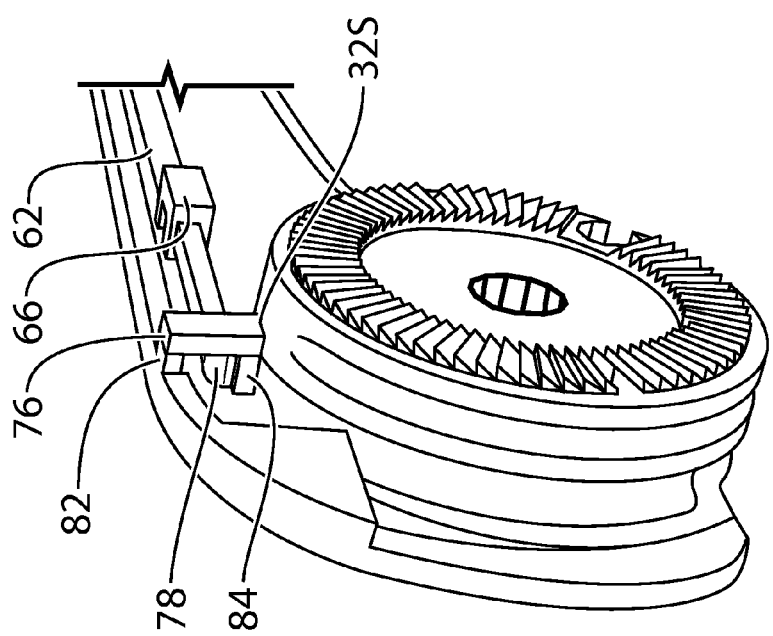
FIG. 13 is a perspective view of the parking brake actuator shown in FIG. 1 in a shipping state.

In operation, the parking brake actuator 10 may be provided by a manufacturer to the vehicle assembly plant with the shipping pin 76 in an actuated position, as seen in FIG. 13, where the shipping pin 76 is positioned in the slot 32S of the cable tensioner reel 32 counteracting the biasing torque provided by the clock spring 44 and preventing the cable tensioner reel 32 from rotating due to this force. In FIG. 3 this bias force tends to rotate the cable tensioner reel 32 clockwise. The circumferential position of the slot 32S on the cable tensioner reel 32 is selected such that when the shipping pin 76 engages the slot 32S the cable tensioner reel 32 is unwound to provide for a considerable length of cable 40 extending from the reel. This allows assembly personnel to easily attach the rear end 42 of the cable 40 to the vehicle braking elements without having to overcome the biasing forces generated by the clock spring 44.

Note also that when the shipping pin 76 is in the actuated position the handle 12 may be moved in which case the cable tensioner reel 32 will rotate in conjunction with the movement of the handle 12 but the cable tensioner reel 32 is not further rotated due to the biasing torque of the clock spring 44.

The shipping pin 76 is moved into a non-actuated position by depressing the pushbutton 56. This causes the actuator button 52 to move rearwardly, which in turn causes the slender rod 62 and the sloped end 68 of the dual function cam member to move rearward. The sloped end 68 of the dual function cam member in turn wedges up against the sloped end 80 of the shipping pin projection 78, pushing the shipping pin 76 upwards and out of the cable tensioner reel slot 32S. At this point, the cable tensioner reel 32 is free to rotate under the influence of the bias force provided by the clock spring 44, causing the cable reel 32 to rotate in the cable winding direction. When the rear end of the cable 40 is attached to the vehicle brake element, any slack in the cable 40 will be taken up by the reel 32.

Figure 12:
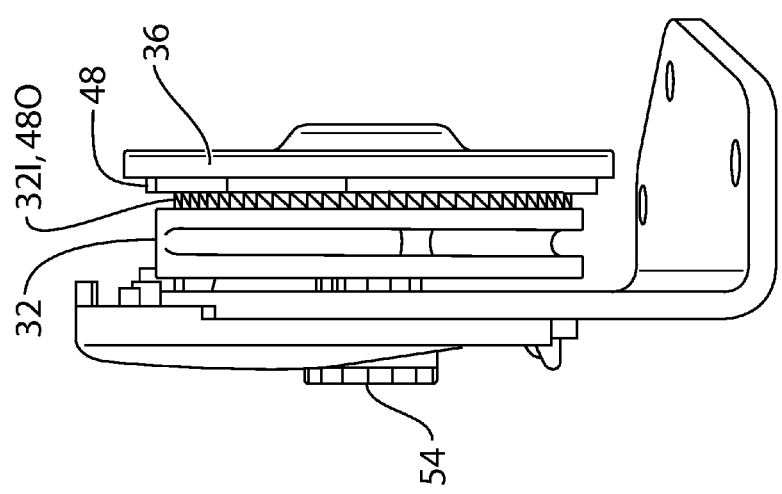
FIG. 12 is an end view of a clutch employed in the parking brake actuator shown in FIG. 1, including the cable reel and disk shown in FIGS. 7-11.
Figure 14:
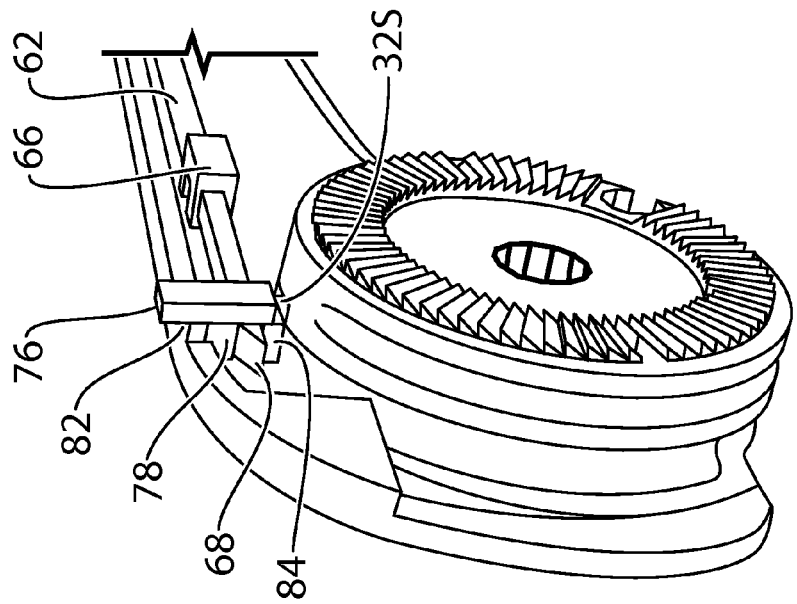
FIG. 14 is a perspective view of the parking brake actuator shown in FIG. 1 in an operating state.

When the handle 12 is in the rest position (which is the position shown in FIGS. 1 and 2), the projections 54K of the driver annulus 54G overlap the projections 48K of the disk inner annulus 48I. The projections 48K, 54K are sized to push the disk 48 axially outward so that the toothed annulus 48O of the disk 48 does not engage the toothed annulus 32I of the cable tensioner reel 32. Accordingly, the cable tensioner reel 32 is decoupled from the handle 12, leaving the biasing clock spring 44 to take up slack in the cable 40, the amount of which may vary over time, without interference from the handle 12. However, when the handle 12 is raised the housing 30 rotates causing the disk 48 to rotate in conjunction therewith due to the engagement between elements 30C and 30D on the housing 30 and elements 48C and 48E on the disk 48. As the disk 48 rotates, the projections 48K move off of the projections 54K of the fixed driver annulus 54G and into the slightly recessed annular portion 54R of the driver annulus 54G. Likewise, the slightly recessed annular portions 48R of the disk 48 move to overlap the projections 54K of the driver annulus 54G. In this position, as a result of the axial inward force provided by the biasing coil spring 50, the toothed annulus 48O of the disk 48 engages the complimentarily toothed annulus 32I of the cable tensioner reel 32, as seen best in the fragmentary end view of FIG. 12. Upon engagement, the disk 48 and handle 12 are coupled to the cable tensioner reel 32 allowing movement of the handle 12 to turn the cable tensioner reel 32, move the cable 40 and engage the vehicle braking elements.

The complementary sloped surfaces 54J and 48J of the driver projections 54K and disk projections 48K provide a smooth transition between the coupled and decoupled positions.

As the handle 12 is moved beyond a selected pivot angle to activate the parking brake, the handle 12 may be held stationary at a given operating angle to continually tension the cable and engage the vehicle brake elements by action of the pawl 70, which releasably locks against the mounting bracket ratchet teeth 22. To release the handle 12, the pushbutton 56 is depressed, causing the actuator shaft 58 to move rearward, which in turn causes the slender rod 62 and the U-shaped section 66 of the dual function cam member to move rearward and release the pawl.

Those skilled in the art will appreciate that while the clutch is shown as normally closed with the driver mounted between the cable reel and the axially moving disk to push apart the two elements when the lever is in its rest position, an alternative embodiment with a normally open clutch is also contemplated. In this alternative embodiment the driver is mounted to the outside of the axially movable disk and a coil spring provides an outward biasing force to the disk. In this case, the projections of the driver are arranged to push the disk against the cable tensioner reel when the lever moves away from its rest position.

It will also be appreciated that while the gripping faces of the clutch have been shown as toothed annuli, other form factors may be applied. For example, rather than 360 degree annuli a smaller sector can be used since the parking brake lever only has a limited pivot range of less than 180 degrees. In addition, instead of complementarily sloped teeth, other gripping elements can be used such as cog or bevel profiles.

In addition, while the actuation lever in the illustrated embodiment is shown as a hand-operated lever, the clutch mechanism may also be incorporated into a foot-operated lever, (i.e., a pedal).

Similarly, other modifications may be made to the embodiments described herein without departing from the fair meaning of the appended claims.

The invention claimed is:

1. A parking brake actuator, comprising:
a mounting bracket configured for mounting the parking brake actuator to a vehicle;
an actuation lever pivotally mounted to the mounting bracket for pivotal movement about a pivot axis between a rest position and a working position;
a cable;
a cable reel rotatable about the pivot axis, the cable having an end that is connected to the cable reel, wherein rotation of the cable reel in a first direction winds cable thereon and rotation of the cable reel in a second direction unwinds cable therefrom;
a tensioning spring connected between the actuation lever and the cable reel configured for taking up slack in the cable; and
a clutch for coupling the cable reel to the actuation lever when the actuation lever is pivoted to the working position and uncoupling the cable reel from the actuation lever when the actuation lever returns to the rest position, wherein the clutch includes a first grip face fixed to the cable reel;
a disk that is slidable along the pivot axis, the disk having a second grip face and being biased axially to have the second grip face engage the first grip face; and
a driver that is fixed to the mounting bracket, wherein the driver axially moves the disk to disengage the second grip face from the first grip face when the actuation lever is in the rest position.

2. A parking brake actuator as claimed in claim 1, wherein the actuation lever, the cable reel, and the disk rotate about a pivot pin secured to the mounting bracket.

3. A parking brake actuator as claimed in claim 2, wherein the driver is positioned between the cable reel and the disk.

4. A parking brake actuator as claimed in claim 3, wherein: the driver includes a driver shaft that is mounted to the pivot pin; the driver shaft is connected to the mounting bracket; and the cable reel rotates on the driver shaft.

5. A parking brake actuator as claimed in claim 3, wherein the first grip face is integrally formed in the cable reel.

6. A parking brake actuator as claimed in claim 5, wherein the driver includes at least one driver projection and the disk includes at least one disk projection, wherein the at least one driver projection and the at least one disk projection oppose one another when the actuation lever is in the rest position to disengage the disk grip face from the cable reel grip face, and wherein the at least one driver projection and the at least one disk projection are offset one another when the actuation lever is in the working position to allow the disk grip face to lock against the cable reel grip face.

7. A parking brake actuator as claimed in claim 6, wherein the housing includes a cover plate, and a coil spring is disposed between the cover plate and the axially movable disk to bias the disk against the cable reel.

8. A parking brake actuator as claimed in claim 1, wherein the actuation lever includes a housing surrounding the pivot axis, said cable reel, tensioning spring, and clutch being mounted in the housing.

9. A parking brake actuator as claimed in claim 8, wherein the biasing element comprises a clock spring having two hook ends, one hook end connected to the actuation lever and the other end hook connected to the cable reel.

10. A parking brake actuator as claimed in claim 1, wherein the actuation lever has a handgrip thereon.

11. A parking brake actuator as claimed in claim 10, further comprising: a pawl pivotally mounted to the actuation lever; a pushbutton actuator connected to the pawl; and a plurality of ratchet teeth formed in the mounting bracket, wherein the pawl is biased to engage a specification when the actuation lever is moved to the working position and, when activated, the pushbutton actuator releases the pawl from the specification.

12. A parking brake actuator as claimed in claim 11, further comprising: an actuation lever slot formed in the actuation lever; a cable reel slot formed in the cable reel that is in register with the slot in the actuation lever when the cable reel is positioned at a point where the cable is substantially unwound from the cable reel; a pin slidably mounted to the actuation lever slot and movable within the cable reel slot when the cable reel slot is registered with the actuation lever slot; and a rod, connected to the pushbutton actuator, engaging the pin to urge the pin out of the cable reel slot.

13. A parking brake actuator as claimed in claim 12, wherein the rod has a rod ramp that engages a pin ramp on the pin, such that movement of the rod by the pushbutton actuator drives the rod ramp to slide along the pin ramp and drive the pin out of the cable reel slot.

14. A parking brake actuator as claimed in claim 1, wherein the tensioning spring is disposed between the actuation lever and the cable reel; the first grip face is provided by an outer face of the cable reel; and the driver is disposed about the pivot axis between the disk and the cable reel.

15. A parking brake actuator, comprising:
a mounting bracket configured for mounting the parking brake actuator to a vehicle;
a lever pivotally mounted to the mounted bracket for pivotal movement about a pivot axis between a rest position and a working position;
a cable;
a cable reel rotatable about the pivot axis, the cable having an end being connected to the cable reel such that rotation of the cable reel in a first direction winds cable thereon and rotation of the cable reel in a second direction unwinds cable therefrom;
a tensioning spring connected between the actuation lever and the cable reel for taking up slack in the cable; and
a clutch configured for coupling the cable reel to the actuation lever when the actuation lever is pivoted to the working position and uncoupling the cable reel from the actuation lever when the actuation lever returns to the rest position, the clutch including: a first grip face fixed to the cable reel;
a disk slidably mounted to the actuation lever for movement along the pivot axis, the disk having a second grip face and being movable between an engaged position where the second grip face engages the first grip face and a disengaged position where the second grip face does not engage the first grip face, the disk being biased axially to one of the engaged and disengaged positions; and
a driver, fixed to the mounting bracket, for moving the disk axially to the position opposite of the disk bias position as the actuation lever moves between the rest and working positions.

16. A parking brake actuator as claimed in claim 15, wherein the disk is biased axially to have the second grip face engage the first grip face and wherein the driver axially moves the disk to disengage the second grip face from the first grip face when the actuation lever is brought into the rest position.

17. A parking brake actuator as claimed in claim 16, wherein the actuation lever, the cable reel, and the disk rotate about a pivot pin secured to the mounting bracket, and the driver is mounted on the pivot pin between the cable reel and the disk.

18. A parking brake actuator as claimed in claim 17, wherein the driver includes at least one driver projection and the disk includes at least one disk projection, wherein the at least one driver projection and the at least one disk projection oppose one another when the actuation lever is in the rest position to disengage the disk grip face from the cable reel grip face, and wherein the at least one driver projection and the at least one disk projection are offset one another when the actuation lever is in the working position to allow the disk grip face to lock against the cable reel grip face.

19. A parking brake actuator as claimed in claim 15, wherein the disk is biased axially to have the second grip face disengage from the first grip face and wherein the driver axially moves the disk to engage the second grip face with the first grip face when the actuation lever is brought into the working position.

20. A parking brake actuator as claimed in claim 19, wherein the actuation lever, the cable reel, and the disk rotate about a pivot pin secured to the mounting bracket, and the disk is mounted on the pivot pin between the cable reel and the driver.

21. A parking brake actuator as claimed in claim 20, wherein the driver includes at least one driver projection and the disk includes at least one disk projection, wherein the at least one driver projection and the at least one disk projection oppose one another when the actuation lever is in the rest position to disengage the disk grip face from the cable reel grip face, and wherein the at least one driver projection and the at least one disk projection are offset one another when the actuation lever is in the working position to allow the disk grip face to lock against the cable reel grip face.

22. A parking brake actuator as claimed in claim 15, wherein the tensioning spring is disposed between the lever and the cable reel; the first grip face is provided by an outer face of the cable reel; and the driver is disposed about the pivot axis between the disk and the cable reel.

23. A parking brake actuator, comprising:
a mounting bracket configured for mounting the parking brake actuator to a vehicle;
a lever pivotally mounted to the mounting bracket for pivotal movement about a pivot axis between a rest position and a working position;
a cable;
a cable reel rotatable about the pivot axis, the cable having an end connected to the cable reel, wherein rotation of the cable reel in a first direction winds cable thereon and rotation of the cable reel in a second direction unwinds cable therefrom;
a tensioning spring connected between the actuation lever and the cable reel for taking up slack in the cable;
a slot formed in the actuation lever;
a slot formed in the cable reel that is registerable with the actuation lever slot when the cable reel is positioned at a point where the cable is substantially unwound from the cable reel;
a pin slidably mounted in the actuation lever slot and movable into the cable reel slot when the actuation lever slot is registered with the actuation lever slot; and
a pushbutton actuator connected to the actuation lever, and including a rod for urging the pin out of the cable reel slot.

24. A parking brake actuator as claimed in claim 23, wherein a pin projection extends laterally from the pin, wherein the pin projection cooperates with the rod, and wherein the actuation lever blocks the pin projection in order to prevent the pin from exiting the actuation lever slot.

25. A parking brake actuator as claimed in claim 24, wherein the rod and pin projection have complimentary sloped ramps engaging one another.

26. A parking brake actuator as claimed in claim 23, further comprising a clutch coupling the cable reel to the actuation lever when the actuation lever is in the working position and decoupling the cable reel from the actuation lever when the actuation lever is in the working position.

* * * * *